3,001,754
MOUNTING MEANS FOR TELESCOPING
POLE SUPPORT
Dewalt W. Fowler, St. Louis, Mo., assignor to Paul Flum Merchandising Ideas Inc., St. Louis, Mo., a corporation of Missouri
Filed Nov. 26, 1958, Ser. No. 776,588
1 Claim. (Cl. 248—357)

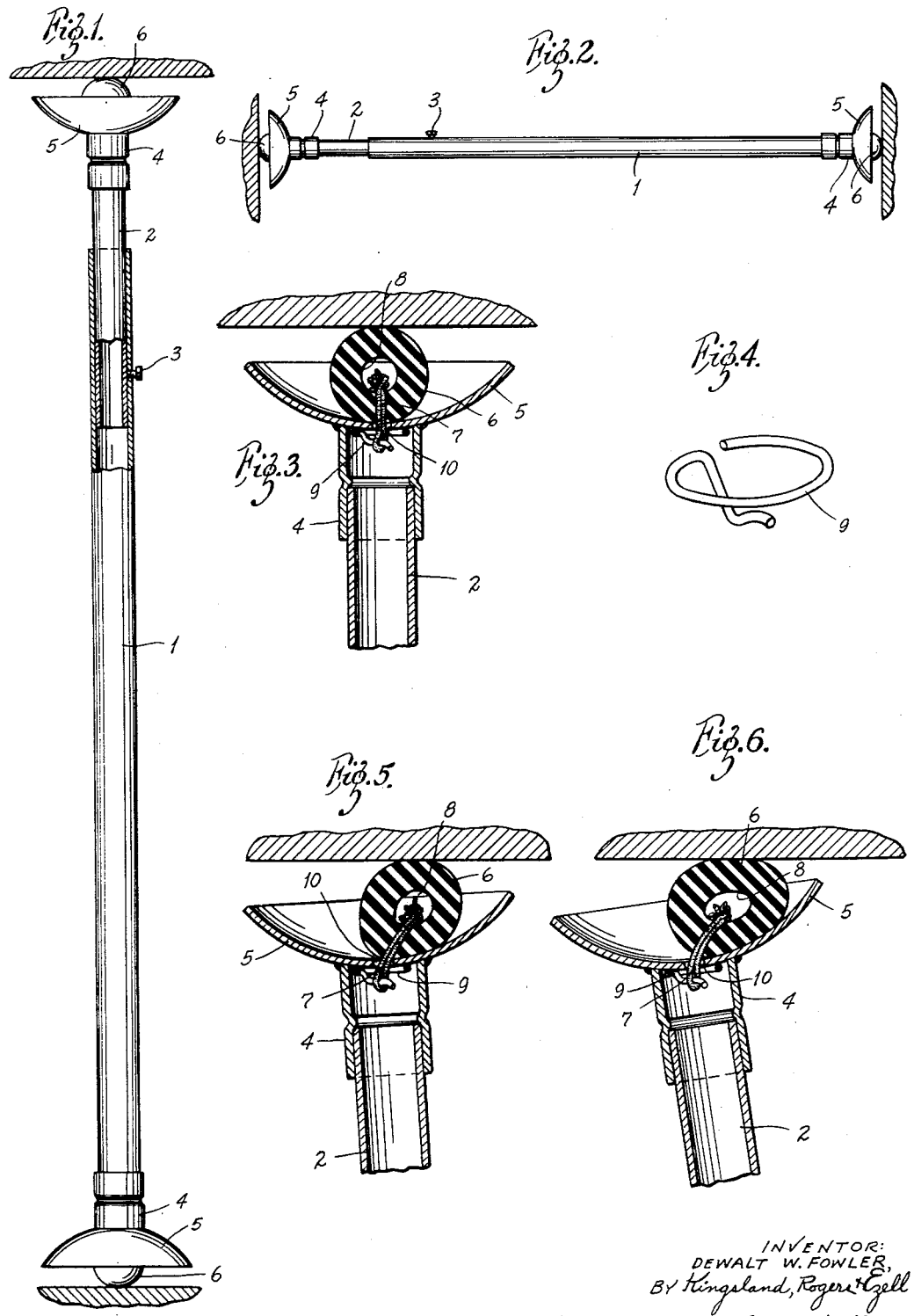

The present invention relates to a mounting means for a telescoping pole support.

There are many occasions in which a temporary rigid support member may be required. For example, spaced pole supports mounted in a vertical position may be employed for stringing a wire or cable between the supports, and thereby provide a horizontal line to carry various articles as desired.

Again, a single support may be mounted in a vertical position to carry brackets or hooks that may be required to support various articles for display.

In addition, the support may be mounted in a horizontal position to carry curtains or draperies and the like.

Other similar uses for the temporary pole support in vertical or horizontal position will occur.

An object of the invention, therefore, is to provide means whereby a telescoping member constituting an elongated pole support may be mounted in a vertical position between floor and ceiling, or between spaced walls or other surfaces to mount the support in a horizontal position, and which support may be readily mounted in place and dismounted so that it may be moved from place to place where required.

Additional advantages of the invention will be readily apparent from the following detailed description thereof taken in connection with the accompanying drawing, in which:

FIGURE 1 is a view illustrating the mounting of the support in a vertical position between floor and ceiling;

FIGURE 2 is a view of the support mounted between parallel surfaces in a horizontal position;

FIGURE 3 is a vertical section through the upper end of a support illustrating the normal mounting of the pole support in which a resilient sphere is supported in a cup having upwardly inclined walls;

FIGURE 4 is a metal clip constituting an attachment for a resilient band;

FIGURE 5 is a vertical section illustrating the movement of the sphere in the cup to return to normal position following the removal of a deflecting force against the pole support; and FIGURE 6 is a similar view illustrating the movement of the sphere when the pole support is deflected laterally.

In the embodiment of the invention as illustrated in the drawing, the support proper is shown as comprising telescoping members 1 and 2, the member 2 fitting into the upper end of the member 1, and the member 2 may be protracted and retracted in the member 1. These members constitute the elongated pole support and preferably comprise interfitting metal tubes. A setscrew 3 provides means for holding the members rigidly together when in selected adjustments.

The member 2 has attached to its upper end a sleeve 4 which rigidly supports a cup member 5. This member is circular in form and is formed with a concave inner surface. The diameter of the concave inner surface is considerably greater than the diameter of the rim of the cup to afford compression of a resilient member to be described. As illustrated, the sleeve and cup members 4 and 5 are duplicated at the lower end of the member 1, although it is contemplated that in some embodiments one or the other of the sleeves and cups may be omitted.

The resilient compressible member 6 referred to in the preceding paragraph, preferably in the form of a hollow rubber ball, is mounted in the interior of the cup member 5, and, in order to hold the the sphere in the cup, a resilient band 7 has one end fitted in a channel 8 in the member 6, which band extends downwardly through the wall thereof, the lower end of the band 7 being retained by a clip 9 (FIGURE 4) seated below an opening 10 in the bottom of the cup member 5.

The diameter of the compressible member 6 is considerably less than the diameter of the rim of the cup member 5, but is greater than the maximum depth of the inner surface of the cup member 5.

In FIGURE 2, the device is illustrated in a horizontal position.

By reference to FIGURE 3, it will be understood that in mounting the support the telescoping members 1 and 2 are extended sufficiently so that the member 6, when a single member is used, will impinge against the surface to which the support is to be attached and exert axial pressure sufficient in normal use to retain the support either vertically or horizontally. When two of the contact members are used, one at each end of the support, both of the members 6 will impinge against the adjacent surface and tend to increase the axial pressure on the pole support comprising the two telescoping members 1 and 2.

It will be noted that the diameter of the member 6 is so proportioned to the depth of the cup 5 that the upper surface of the sphere extends above the rim of the cup. In mounting the support, the upper surface of the sphere will contact the adjacent surface, but the rim of the cup will be spaced from the surface. The contact of the member 6 with the surface to which the support is attached, therefore, will avoid any injury to such surface because of the resilient character of the sphere.

From the foregoing description, it will be understood that the support is normally mounted between opposed surfaces in vertical position (FIGURE 1), or in horizontal position (FIGURE 2), depending on the use to which it is desired that the device is to be employed.

The telescoping members are extended between these opposed surfaces until the compressible member 6 impinges against the adjacent surface and is compressed sufficiently to exert axial straight line pressure on the pole support. While the support remains in its selected adjustment, either extending vertically or horizontally as desired, it will be held by the normal resilient pressure exerted by expanding force of the resilient compressible member 6.

It is to be understood that, if a pair of retaining members are employed, one at each end, the effect of the expansive force of both members 6 will be exerted to retain the pole support in position.

If an accidental deflecting force is exerted against the pole support, the member 6 will ride upwardly on the concave wall of the cup member 5. This movement exerts increased axial force on the pole support due to the further compression of the member 6, opposing the deflecting force. As soon as this force is removed, the tendency of the member to expand from its compressed condition will tend to return the pole support automatically to original normal position .

From the foregoing description, it will be understood that the structure disclosed fully accomplishes its objectives and that it provides a convenient readily mountable support that may be easily erected in place and demounted for relocation as may be desired.

What is claimed is:

A rod adapted to be mounted between opposed rigid surfaces; means connected to the rod for resisting forces applied to the rod having components of various magnitudes normal to the axis of the rod comprising a rigid cup member attached to at least one end of the rod; said cup member having a concave inner surface of substantially arcuate shape with the rim of the cup member defining substantially a circle, the diameter of the concave inner surface being considerably greater than the diameter of the rim of the cup, a resilient spherical compressible member mounted in the cup member, the diameter of the compressible member being considerably less than the diameter of the rim of the cup but greater than the maximum depth of the inner surface relative to the rim of the cup; resilient means holding the compressible member in the cup member; said compressible member being in continual contact with said inner surface; the resilient holding means being sufficiently long and resilient to permit the compressible member to move across a portion of the inner surface when a force is applied having a component normal to the rod; the arrangement being such that when the compressible member is in engagement with a rigid surface and a force is applied to said rod having a component normal to the axis of the rod and parallel to the rigid surfaces, the compressible member will become more tightly compressed, thus applying a greater holding pressure against said rigid surface.

References Cited in the file of this patent

UNITED STATES PATENTS

| | | |
|---|---|---|
| 565,546 | Kingston | Aug. 11, 1896 |
| 1,679,881 | Simpson | Aug. 7, 1928 |
| 1,721,227 | Manley | July 16, 1929 |
| 2,613,898 | Williams | Oct. 14, 1952 |
| 2,666,608 | Holm | Jan. 19, 1954 |

FOREIGN PATENTS

| | | |
|---|---|---|
| 87,701 | Germany | July 16, 1896 |
| 327,136 | Germany | Oct. 7, 1920 |